United States Patent
Dierbeck

[11] 3,778,037
[45] Dec. 11, 1973

[54] AERATOR WITH IMPROVED IMPELLER ACTION

[76] Inventor: Robert F. Dierbeck, Rt. 1, Adell, Wis. 53001

[22] Filed: May 4, 1971

[21] Appl. No.: 140,028

[52] U.S. Cl..................... 261/28, 261/79 A, 261/91
[51] Int. Cl............................................... B01f 7/32
[58] Field of Search..................... 261/28, 79 A, 91, 261/120

[56] References Cited
UNITED STATES PATENTS

| | | | |
|---|---|---|---|
| 3,218,042 | 11/1965 | Ciabattari et al. | 261/120 |
| 3,539,158 | 11/1970 | Roos | 261/91 |
| 3,610,590 | 10/1971 | Kaelin | 261/91 |
| 3,470,092 | 9/1969 | Bernard | 261/91 |

Primary Examiner—Tim R. Miles
Assistant Examiner—Steven H. Markowitz
Attorney—Andrus, Sceales, Starke & Sawall

[57] ABSTRACT

An aerator for bodies of water or other liquid which includes a submerged impeller which directs water or other liquid upwardly to an aerating means disposed above the water level. The aerating means includes a two-part rotary member. The lower portion draws air in and mixes it with the upwardly moving water. The upper portion forces the mixed air and water outwardly, where the water falls back into the body of water.

6 Claims, 4 Drawing Figures

PATENTED DEC 11 1973

3,778,037

INVENTOR
ROBERT F. DIERBECK

BY
Andrus, Sceales, Starke & Sawall
ATTORNEYS

AERATOR WITH IMPROVED IMPELLER ACTION

BACKGROUND AND SUMMARY OF THE INVENTION

This invention relates to an aerator with improved impeller action. More particularly, the invention is directed to an aerator for ponds, sewage tanks or other bodies of liquid wherein the liquid is cleansed by intimately mixing with air.

In accordance with the invention, the device includes a submerged impeller which directs water or other liquid upwardly to an aerating means disposed above the liquid level. The aerating means includes a two-part rotary member. The lower portion draws air in and mixes it with the upwardly moving liquid. The upper portion forces the mixed air and liquid outwardly, where the liquid falls back into the body of liquid.

DESCRIPTION OF THE DRAWING

The accompanying drawing illustrates the best mode presently contemplated by the inventor for carrying out the invention.

In the drawing.

DESCRIPTION OF THE PREFERRED EMBODIMENT

Figure 1:
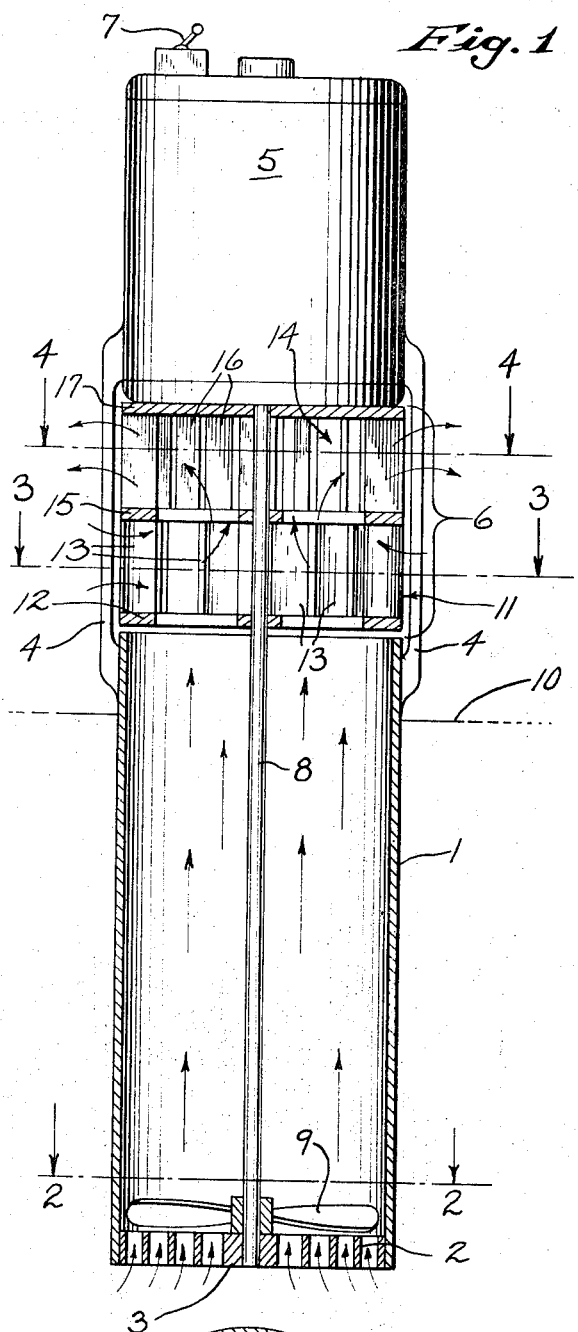
FIG. 1 is a central vertical section of an aerator constructed in accordance with the invention, and showing it installed in a body of water.

As shown in the drawing, the aerator of the invention comprises a vertically disposed open ended tubular housing 1. A protective open grill 2 is mounted within housing 1 adjacent the lower intake end thereof, with grill 2 also providing support for a bearing 3. The lower ends of a plurality of vertically extending circumferentially spaced brackets 4 are mounted to the exterior of housing 1 adjacent the upper discharge end thereof, with brackets 4 extending upwardly. A motor 5 is mounted to the upper bracket ends, and is spaced from the upper housing end, as at 6. Motor 5 is adapted to be actuated in any suitable way, as by a switch 7.

A motor output shaft 8 extends downwardly coaxially through space 6 and housing 1, and is received within bearing 3. A propeller or impeller 9 is mounted adjacent the lower end of shaft 8 and serves as means to pull water through the intake and force it upwardly through the housing and into space 6.

The device is disposed so that the surface level 10 of the body of water to be aerated is between the ends of housing 1 and thus below space 6. Preferably, and as shown in FIG. 1, level 10 is a short distance below the upper housing end so that the housing is at least partially submerged.

Figure 3:
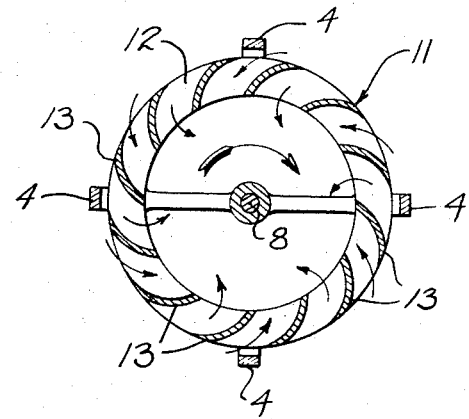
FIG. 3 is a transverse section of the air intake and mixing cage taken on line 3—3 of FIG. 1.
Figure 4:
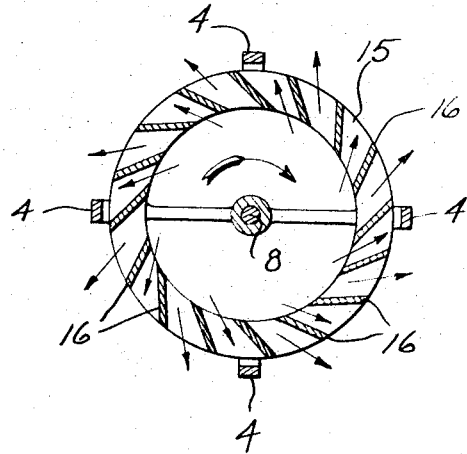
FIG. 4 is a transverse section of the air and water discharge cage taken on line 4—4 of FIG. 1.
Figure 2:
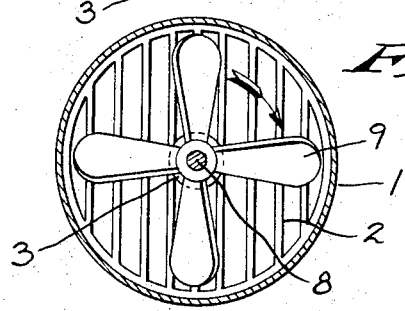
FIG. 2 is a transverse section taken on line 2—2 of FIG. 1.

In accordance with the invention, aerator means are disposed in space 6, and the invention contemplates a dual function system. For this purpose, a dual cage arrangement is utilized which is suitably mounted for rotation with shaft 8 and simultaneous rotation with impeller 9. Lower cage 11 includes a suitable cylindrical support 12 on which is mounted a plurality of circumferentially spaced vertically elongated air intake vanes 13. Vanes 13 are cup-like in section with open ends facing in the direction of shaft rotation, and curved portions which direct the air inwardly into the interior of cage 11, as shown by the arrows in FIG. 3. Impeller 9 operates to pump water into cage 11, where it is intimately contacted and mixed with the air being forced thereinto by vanes 13.

Upper cage 14 is disposed directly above cage 11 and may be integral therewith if desired. Cage 14 also comprises a suitable cylindrical support 15 on which is mounted a plurality of circumferentially spaced vertically elongated air and water discharge vanes 16. Vanes 16 are shown as generally planular and disposed at an acute angle to a cage tangent so that, as the intimate water and air mixture are subsequently pumped upwardly together from cage 11, vanes 16 thrust the mixture outwardly from the device in the form of a spray, as shown, where the water falls back into the water body.

Cage 14 is provided with a cover 17, which in some instances may be a portion of the housing of motor 5, thereby creating a closed-topped chamber so that the water and air mixture is forced outwardly against discharge vanes 16.

The aerator of the invention is believed to provide a unique advance in the art of fluid treatment. While the device has been primarily described in connection with water treatment, sewage and other liquids are also contemplated for treatment.

Various modes of carrying out the invention are contemplated as being within the scope of the following claims particularly pointing out and distinctly claiming the subject matter which is regarded as the invention.

I claim:

1. A device for aerating a body of water or the like, comprising, in combination:
   a. an open-ended vertically extending tubular housing adapted to be at least partially submerged in the said body,
   b. a rotary impeller disposed within said housing, with said impeller forming means to pump water upwardly therethrough to a space disposed above the upper discharge end thereof and also above the said body,
   c. a first cage disposed in said space and having air intake vanes,
   d. a second cage disposed in said space directly above said first cage and having vanes for thrusting discharge of air and water therefrom,
   e. and means to simultaneously rotate said impeller and said cages so that air is forced into said first cage and intimately mixed with water pumped thereinto by said impeller, and so that the air and water mixture is subsequently forced up into said second cage and thrust outwardly therefrom.

2. In the device of claim 1; a cover disposed above said second cage and forming a closed-topped chamber therewith.

3. The device of claim 1 in which said rotating means comprises:
   a. a motor,
   b. and a motor output shaft extending axially through said cages and impeller and secured thereto.

4. The device of claim 3:
   a. in which said motor is disposed above said second cage, b. and cover means disposed between said second cage and said motor to form a closed-topped chamber with said second cage.

5. The device of claim 4 wherein a portion of the housing of said motor forms said cover means.

6. A device for aerating a body of water or the like, comprising, in combination:
   a. an open-ended vertically extending tubular housing adapted to be at least partially submerged in the said body,
   b. a rotary impeller disposed within said housing, with said impeller forming means to pump water upwardly therethrough to a space disposed above the upper discharge end thereof and also above the said body,
   c. a first member disposed in said space and having air intake means,
   d. a second member disposed in said space directly above said first member and having means for thrusting discharge of air and water therefrom,
   e. and means to simultaneously rotate said impeller and said members so that air is forced into said first member and intimately mixed with water pumped thereinto by said impeller, and so that the air and water mixture is subsequently forced up into said second member and thrust outwardly therefrom.

* * * * *